United States Patent [19]

Staudte

[11] Patent Number: 5,210,809
[45] Date of Patent: May 11, 1993

[54] DEVICE FOR THE OPTICALLY CONDUCTIVE CONNECTION OF TWO OPTICAL WAVEGUIDES

[75] Inventor: Bernd Staudte, Berlin, Fed. Rep. of Germany

[73] Assignee: Krone Aktiengesellschaft, Berlin, Fed. Rep. of Germany

[21] Appl. No.: 783,421

[22] Filed: Oct. 28, 1991

[30] Foreign Application Priority Data

Nov. 3, 1990 [DE] Fed. Rep. of Germany ....... 4035259

[51] Int. Cl.⁵ .............................................. G02B 6/00
[52] U.S. Cl. ..................................................... 385/70
[58] Field of Search .......................................... 385/70

[56] References Cited

U.S. PATENT DOCUMENTS

| | | | |
|---|---|---|---|
| 4,047,796 | 9/1977 | Kao et al. | 385/70 |
| 4,134,641 | 1/1979 | Kao et al. | 385/70 |
| 4,179,186 | 12/1979 | Tynes | 385/70 |
| 4,927,229 | 4/1990 | Tanaka et al. | 385/70 |

*Primary Examiner*—Akm E. Ullah
*Attorney, Agent, or Firm*—McGlew and Tuttle

[57] ABSTRACT

The invention relates to a device for the optical conductive connection of two optical waveguides 1, 2, comprising a sleeve body 3, 13 overlapping the ends of the optical waveguides, and being twistable and plastically deformable. In order to achieve a simple construction and handling of the device, the invention provides that the sleeve body 3, 13 is composed of an outer sleeve jacket 7, 17 with a continuous longitudinal slot. The sleeve jacket is twistable and elastically deformable. The inner side of the sleeve jacket, of support crosspieces 8, 18, form circular segments, in their cross sections, and enclosing a central through-opening 9, 19 for receiving the ends of the optical waveguides 1, 2.

16 Claims, 3 Drawing Sheets

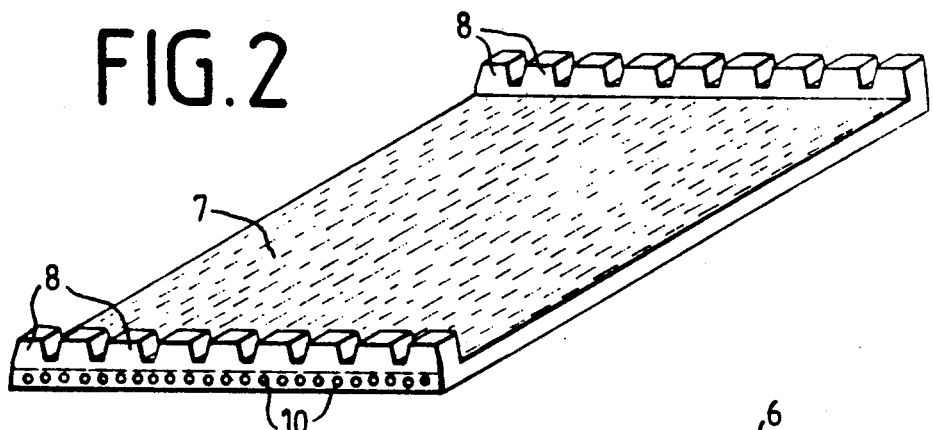
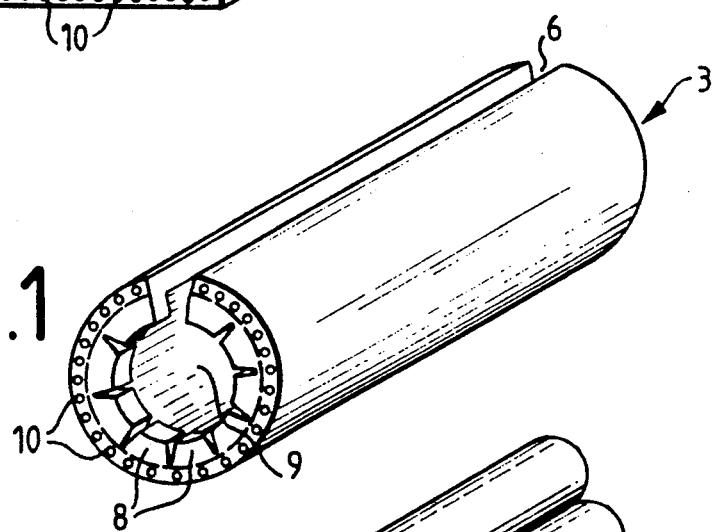
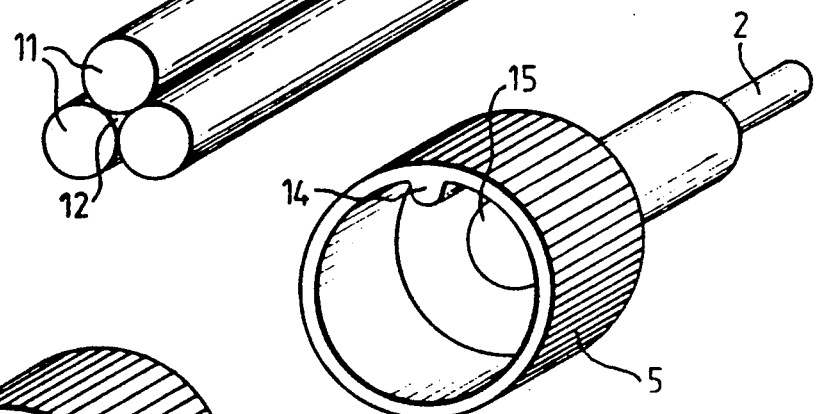
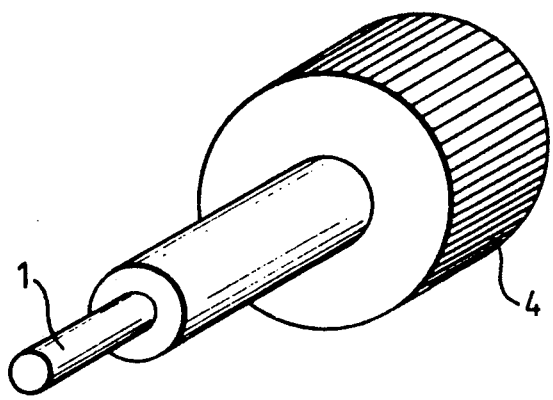

DEVICE FOR THE OPTICALLY CONDUCTIVE CONNECTION OF TWO OPTICAL WAVEGUIDES

FIELD OF THE INVENTION

The invention relates to a device for the optically conductive connection of two optical waveguides, comprising a sleeve body overlapping the ends of the optical waveguides, being twistable and plastically deformable. Such a device is used as a quick-connect device for waveguides, in particular in glass-fiber data networks.

BACKGROUND OF THE INVENTION

From EP-0.016.911, there is known in the art a device of the aforementioned species. Therein, the sleeve body includes recesses formed parallel to its sleeve axis and forming, between two annular end sections, strip-type crosspieces for connecting the two end sections. The annular end sections of the sleeve body comprise radially opposed engagement grooves, for torsion pieces having correspondingly radially opposed cams on their front sides. Prior to the connection of two optical waveguides, one torsion piece each is slid over each of the optical waveguides, and the ends of the optical waveguides are slid into the sleeve body. The cams of the torsion pieces are brought into engagement with the front-side recesses of the annular end sections of the sleeve body. Then, the two torsion pieces are rotated in opposite directions. In this way, the strip type crosspieces between the annular end sections are twisted and closely contact the two ends of the abutting optical waveguides. By using a plastically deformable material, for the sleeve body, the deformation is maintained and thereby the two ends of the optical waveguide are optically conductively connected. It is disadvantageous, according to this construction, that the two ends of the optical waveguide are not centered in the sleeve body, and that the end optical waveguides are not fully enclosed by the sleeve body.

From DE 32 35 090 AI, there is known another device optically conductive connection of two optical waveguides, wherein a cage of deformable rods is formed between two cylindrical end sections These rods contact the ends of the optical waveguides when twisting the two annular end sections in opposite directions, in the same way as described above. It is necessary, herein, to lock the two annular end sections relative to one another, after twisting. For this purpose the two annular end sections are provided with depressions or elevations, resp., and must be provided with latching springs for locking the twisted end position.

SUMMARY AND OBJECTS OF THE INVENTION

It is a primary object of the invention to provide a device for the optically conductive connection of two waveguides of the aforementioned species, which permits precise centering when connecting the two optical waveguides.

According to the invention, there is provided an outer sleeve jacket with a continuous longitudinal slot. The sleeve jacket is twistable and plastically deformable. On the inner side of the sleeve jacket, support crosspieces are provided, forming circular segments, in their cross sections, and enclosing a central through-opening for receiving the ends of the optical waveguides. The device according to the invention comprises a twistable, plastically deformable sleeve body with a sleeve jacket, developed from a rectangular, planar component, on the inner side of which the support crosspieces forming the circular segments are. This planar element can be rolled up in a simple manner to the sleeve body, the surfaces of the inner sides of the circular segments resting upon each other, and centrally enclosing a through-opening for receiving the ends of the optical waveguides. The device according to the invention is, therefore, easy to machine and assemble. The sleeve body can, however, also be machined in a different way.

The sleeve body forms a quick-connect device for optical waveguides comprising a plastically deformable clamping element, having, on its inner side, the support crosspieces for enclosing the optical wave guides.

According to a first embodiment of the invention, the support crosspieces are adapted at the two front sides only of the outer sleeve body. The support crosspieces enclose a centering device for centering the optical waveguides. The centering device comprises, according to another embodiment of the invention, two centering rods made of metal or plastic. Between the inner walls of the centering rods the optical waveguides are held and centered at three points.

According to a second embodiment of the invention, the support crosspieces are adapted continuously over the full length of the outer sleeve jacket for immediately enclosing the ends of the optical waveguides. Herein, the support crosspieces can immediately form the centering through-opening for the optical waveguides.

The outer sleeve jacket is preferably of plastically deformable plastic material into which, in an axial direction of the sleeve body, aligned stiffening elements are inserted. The stiffening elements may be composed of metal fibers, in particular aluminum, having plastic material behavior. The centering pieces are preferably also made of plastic.

Still a further object of the invention is to provide a device for quickly and easily making an optically conductive connection between two optical waveguides, wherein the connection arrangement is simple in design, economical to manufacture and rugged in construction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings: .

FIG. 1 is a perspective view of a sleeve body of the device according to a first embodiment of the invention;

FIG. 2 is a perspective view showing a development of the sleeve body with support crosspieces attached thereto;

FIG. 3 is a perspective view showing three centering rods to be inserted into the sleeve body;

FIG. 4 is a perspective view showing two end-side torsion pieces;

DETAILED DESCRIPTION OF THE PREFERRED EMBODIMENT

Figure 5:
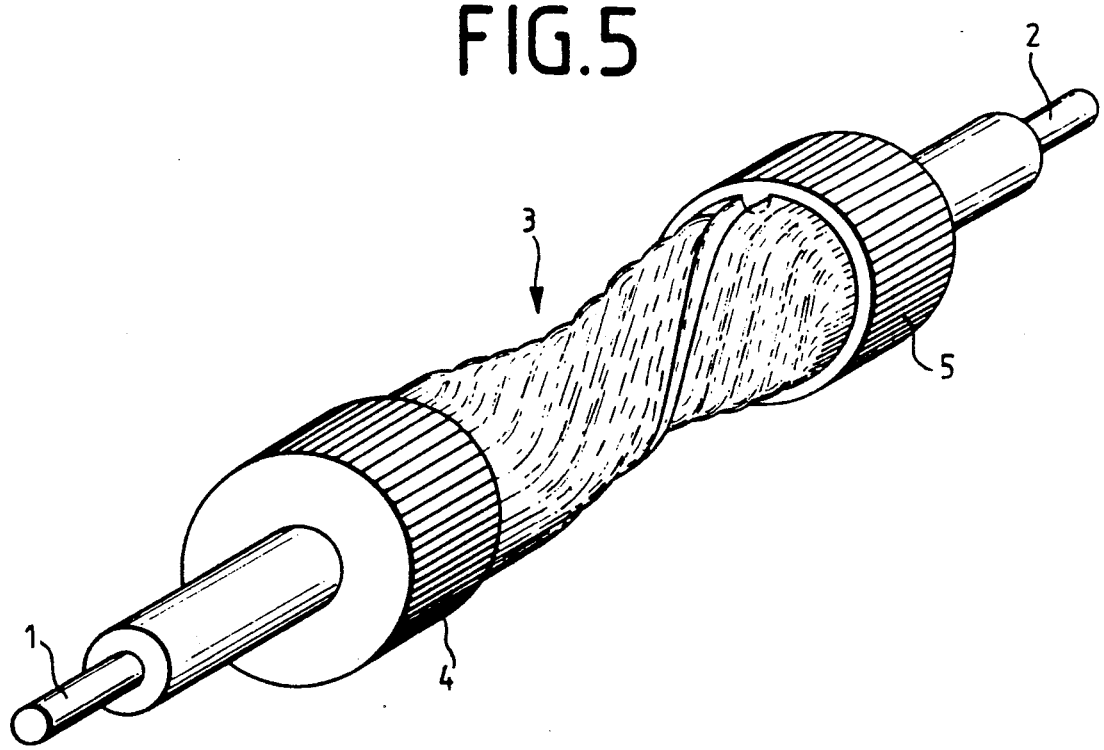
FIG. 5 is a perspective view of a connection of two optical waveguides formed by means of the sleeve body according to FIG. 1 and of the torsion pieces according to FIG. 4.

Referring to the drawings in particular, the device for the optically conductive connection of two optical waveguides 1, 2 comprises a sleeve body 3 and two torsion pieces 4, 5, by means of which the sleeve body 3 is twisted and plastically deformed, in order to connect, in an optically conductive manner, the two optical waveguides 1, 2.

The sleeve body comprises, according to FIGS. 1 and 2, an outer sleeve jacket 7 including a continuous longitudinal slot 6. The sleeve jacket 7 is twistable and plastically deformable. Support crosspieces 8 are disposed on the inner side of the sleeve jacket and form circular segments, in their cross sections. The support crosspieces 8 enclose a central through-opening 9 for receiving the ends of the optical waveguides 1, 2. The support crosspieces 8 are disposed at the axially opposed border sides only, of the outer sleeve jacket 7, as is shown in FIG. 2. The twistable and plastically deformable outer sleeve jacket 7 is made of a plastically deformable plastic material. In an axial direction of the sleeve body 3, aligned stiffening elements 10 are inserted into the plastically deformable material, as is shown in FIG. 3. The stiffening elements 10 are composed of metal fibers, in particular aluminum, having a plastic material behavior. The sleeve jacket 7 is made of a deformable soft plastic material, in particular the two component silicone rubber PTV-ME 622 B.

As is shown in FIG. 1, the side faces of the support crosspieces 8 abut against each other, when the sleeve jacket is rolled up and the inner through-opening 9 and simultaneously the outer longitudinal slot 6 of the sleeve body 3 are formed. As a device for centering the optical waveguides 1, 2, three centering rods 11 are provided, made of metal or plastic, and inserted into the through-opening 9. Between the abutting inner walls of the centering rods 11 a triangular centering channel 12 is formed, wherein the optical waveguides 1 and 2 are held at three points.

For twisting the sleeve body 3, torsion pieces 4, 5 shown in more detail in FIG. 4 are provided. These torsion pieces 4, 5 are provided in cap-type arrangement, and each have a through-opening 15 for the respective optical waveguide 1, 2. On the inner side of the interior of the torsion pieces 4, 5 there are provided cams 14 which engage, for twisting the sleeve body 3, into the longitudinal slot 6 thereof, as will be explained hereinafter in more detail.

The sleeve body 3 represented in FIG. 1 is formed by rolling-up the sleeve jacket 7 shown in FIG. 2, or by molding. The three centering rods 11 received in a centering hose according to FIG. 3 are brought into the through-opening 9 of the sleeve body 3. After mounting one torsion piece 4, 5 each onto each of the two optical waveguides, the front-side ends thereof are slid into the triangular centering channel 12 between the three centering rods 11. The cams 14 of the torsion pieces 4, 5 engage into the longitudinal slot 6 from both sides of the sleeve jacket 3, as is shown in FIG. 5. Then, the torsion pieces 4, 5 are rotated relative to each other. In this way, the sleeve body 3 is twisted and plastically deformed, so that the optical waveguides 1, 2 are fixed into the centering rods 11.

When the torsion pieces 4, 5 are rotated radially and contrarily relative to each other (in opposite rotational directions) during twisting of the sleeve body 3, a torsional moment is exerted on the sleeve body 3, forming a clamping member or means, and the plasticide metal fibers in the jacket portion 7 are twisted by a defined force about a defined angle. Since the torsional moment spreads with an identical amount of force, in conjunction with the plasticity of the used materials, a reduction of the inner diameter or the through-opening 9 of the sleeve body 3, and thus an action on the centering rods 11 will result, the centering rods bringing, due to their geometry, the introduced optical waveguides 1, 2 to a defined position within the centering rods 11, and clamping them fast over their full longitudinal extension. In addition, the centering rods 11 can be provided also in the axial direction with friction resistance means.

The torsion pieces 4, 5, being each provided, on their inner sides, with engagement projections in the form of the cams 14, engage into the longitudinal slot 6 forming an engagement groove, by positive mechanical linkage and by friction. The centering rods 11 can be provided, in one direction, with rough surfaces. When the torsion pieces 4, 5 are rotated radially and contrarily at their ends, the resulting torsional moment will be also transferred to the sleeve body 3. This twists the plasticide metal fibers forming the stiffening element of the sleeve jacket 7, by a certain angle. Since the torsional moment spreads over the full sleeve body 3 with a constant amount of force, as long as the forces or moments resp., do not reach the level necessary for shearing, a reduction of the diameter of the sleeve body 3 is achieved. Accordingly, the force transfer acts on the centering rods 11, and the optical waveguides held therein being clamped fast.

Figure 6:
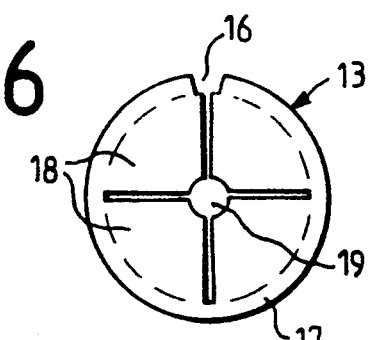
FIG. 6 is a front view of a sleeve body according to a second embodiment in a rolled-up condition.
Figure 7:
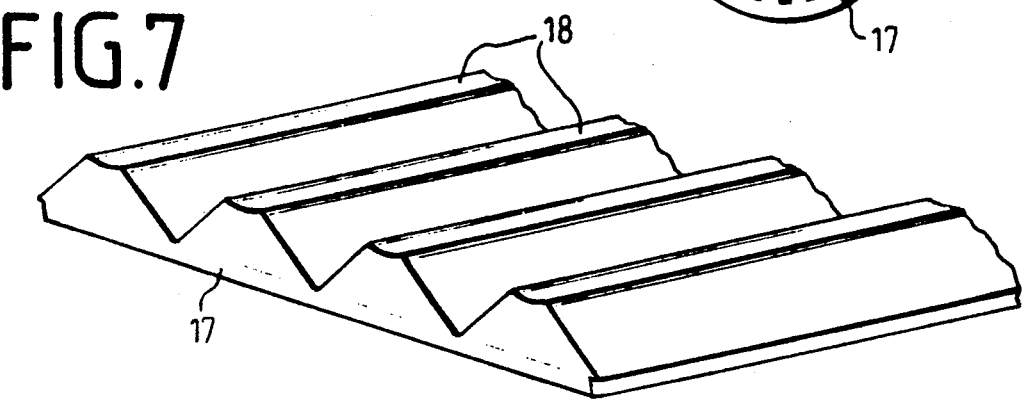
FIG. 7 is a perspective view of the sleeve body according to FIG. 6 in a rolled-up condition.

In the second embodiment of the sleeve body 13 represented in FIGS. 6 and 7, the inner centering rods are omitted. In this embodiment, the support crosspieces 18 are adapted to immediately and continuously enclose the optical waveguides 1, 2 over the full length of the outer sleeve jacket 3, as is shown in FIG. 7. The optical waveguides 1, 2 are, herein, immediately inserted into the central through-opening 19 of the sleeve body 13. The further features, with the longitudinal slot 6 and the torsion pieces 4, 5, corresponds with the first embodiment.

Figure 8:
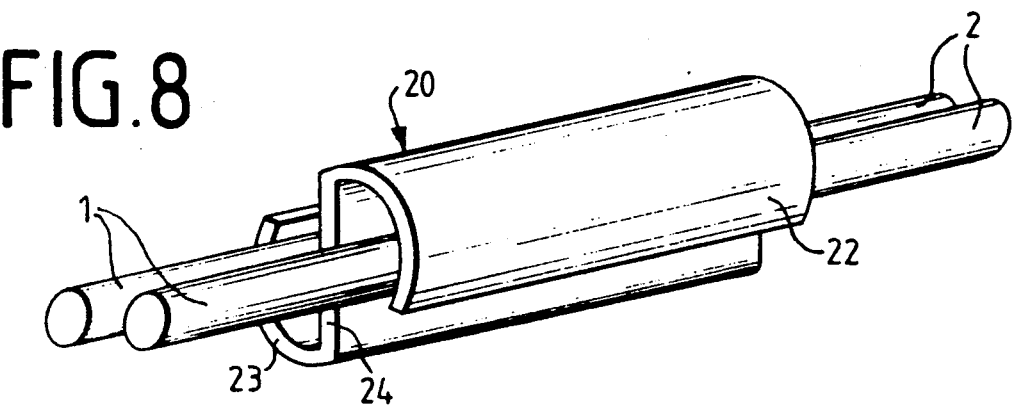
FIGS. 8 and 9 are perspective views of other centering pieces according to the invention.
Figure 9:
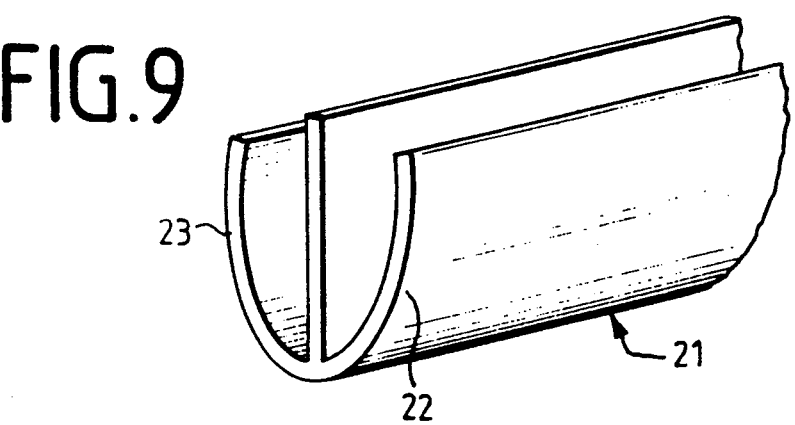

In FIGS. 8 and 9, further centering pieces 20, 21 are represented, which may be used instead of the centering rods 11 according to FIG. 3, in the sleeve body 3 according to the first embodiment of FIG. 1. The centering pieces 20, 21 serve each for the central, optically conducive connection of two pairs of optical waveguides 1, 2. each centering piece 20, 21 is composed, preferably, of PTFE plastic material for connecting PCS fibers of plastic material, having a diameter of approximately 100 to 1,000 μm. Each centering piece 20, 21 is formed of two semicircular, opposed lugs 21, 23 being connected by means of a central wall 24, and forming pockets for receiving one pair each of optical waveguides 1, 2. In the embodiment according to FIG. 8, the lugs 23, 24 are disposed diagonally opposed, and project from opposite ends of the wall 24. In the embodiment according to FIG. 9, the lugs 23, 24 are disposed at one end, and on opposite sides of the wall 24. When twisting the sleeve body 3, into which a centering piece 20 or 21 is inserted, the pairs of optical waveguides 1, 2 disposed in the pockets are pressed by the moment acting thereupon and the resulting diameter reduction, to the highest point of the respective centering piece 20, 21, and are thus centered and rigidly connected.

While specific embodiments of the invention have been shown and described in detail to illustrate the application of the principles of the invention, it will be understood that the invention may be embodied otherwise without departing from such principles.

What is claimed is:

1. A device for optically conductively connecting two optical waveguides, comprising:
a sleeve body overlapping ends of the two optical waveguides, said sleeve body being composed of a material means which is twistable and plastically deformable for clamping the ends of the two optical waveguides, said sleeve body comprising an outer sleeve jacket defining a continuous longitudinal slot and, on an inner side of said sleeve jacket a plurality of support crosspieces forming segments of a cross section of said sleeve body, said sleeve jacket defining a central through opening for receiving the ends of the optical waveguides.

2. A device according to claim 1, wherein said support crosspieces are provided at border sides of said outer sleeve jacket, said device further comprising means for centering optical waveguides, said means for centering the optical waveguides being enclosed by said support crosspieces.

3. A device according to claim 2, wherein said means for centering the optical waveguides is formed of three centering rods made of one of metal and plastic, said centering rods together forming inner walls between which said optical waveguides are held at three points.

4. A device according to claim 1, wherein said support crosspieces extend continuously over a length of said outer sleeve jacket for enclosing said ends of said optical waveguides.

5. A device according to claim 1, wherein said outer sleeve jacket is formed of plastically deformable plastic material including aligned stiffening elements extending in an axial direction of said sleeve body, embedded therein.

6. A device according to claim 4, wherein said outer sleeve jacket is formed of plastically deformable plastic material including aligned stiffening elements extending in an axial direction of said sleeve body, embedded therein.

7. A device according to claim 5, wherein said stiffening elements are composed of metal fibers having a plastic material behavior.

8. A device according to claim 7, wherein said metal fibers are aluminum.

9. A device according to claim 6, wherein said stiffening elements are formed of aluminum metal fibers having plastic material behavior.

10. A device according to claim 2, wherein said centering means is formed of two lugs and a wall portion, said lugs and wall portion being slidable into said sleeve body for forming pockets.

11. A device for optically conductively connecting first and second optical waveguides, the device comprising:
a sleeve body including a first end and a second end, said sleeve body defining a through-opening extending at said first end being positioned around the first optical waveguide, and said through-opening at said second end being positioned around said second optical waveguide, said sleeve body including clamping means for reducing a diameter of said through-opening and rigidly fixing the first and second optical waveguides, said clamping means reducing said diameter of said through-opening by a twisting motion of said first end with respect to said second end and by said clamping means being plastically deformable.

12. A device in accordance with claim 11, wherein:
said sleeve body defines a slot extending from said first end to said second end, said sleeve body also includes a plurality of support cross pieces radially extending from said sleeve body towards an axial center of said sleeve body, said plurality of support cross pieces defining at least a portion of said through-opening and said portion being substantially circular in a radial cross section; and
said clamping means fixing the first and second optical waveguides to said sleeve body and holding the first and second optical waveguides fast with respect to each other.

13. A device in accordance with claim 11, further comprising:
first and second cap means for rigidly connecting to said first and second ends of said sleeve body and for twisting with respect to each other in order to twist and plastically deform said clamping means.

14. A device in accordance with claim 13, wherein:
said sleeve body defines a longitudinal slot; and
said first and second cap means includes a cam means for engaging with said longitudinal slot.

15. A device in accordance with claim 11, wherein:
said sleeve body has a portion made of twistable and plastically deformable material to manifest sad clamping means.

16. A device in accordance with claim 11, wherein:
said sleeve body is formed of a flat material rolled to form a sleeve, said sleeve body defines a longitudinal groove extending through a wall of said sleeve body and formed by opposite ends of said flat material, said flat material includes a plurality of cross pieces extending substantially perpendicular to a plane of said flat material and defining at least a portion of said through-opening when said flat material is rolled up, said portion of said through-opening being substantially circular in a radial cross section, said plurality of cross pieces having sides abutting each other when said flat material is rolled to form said sleeve.

* * * * *